US008378196B2

(12) United States Patent
Lund et al.

(10) Patent No.: US 8,378,196 B2
(45) Date of Patent: Feb. 19, 2013

(54) SONICALLY CONTROLLED WIND-UP MOTOR

(76) Inventors: Bruce Lund, River Forest, IL (US); Paul Paulson, Evanston, IL (US)

(*) Notice: Subject to any disclaimer, the term of this patent is extended or adjusted under 35 U.S.C. 154(b) by 1513 days.

(21) Appl. No.: 11/926,463

(22) Filed: Oct. 29, 2007

(65) Prior Publication Data
US 2009/0107772 A1    Apr. 30, 2009

(51) Int. Cl.
*B60K 6/36*    (2007.10)
*A63H 30/00*   (2006.01)
*G10H 1/32*    (2006.01)

(52) U.S. Cl. .............. 84/600; 84/743; 318/11; 446/175; 446/397

(58) Field of Classification Search ...................... 84/600
See application file for complete search history.

(56) References Cited

U.S. PATENT DOCUMENTS

| 4,097,917 | A | * | 6/1978 | McCaslin ..................... 362/565 |
| 4,767,374 | A | * | 8/1988 | Yang ............................. 446/301 |
| 5,176,560 | A | * | 1/1993 | Wetherell et al. ............. 446/175 |
| 5,820,441 | A | * | 10/1998 | Pracas .......................... 446/354 |
| 6,200,189 | B1 | * | 3/2001 | Coleman et al. .............. 446/298 |
| 6,565,407 | B1 | * | 5/2003 | Woolington et al. ......... 446/175 |
| 2006/0094326 | A1 | * | 5/2006 | Chen ............................. 446/175 |
| 2006/0150451 | A1 | * | 7/2006 | Spielberger et al. ............ 40/412 |

* cited by examiner

*Primary Examiner* — Christopher Uhlir

(57) ABSTRACT

A sonically controlled motor has a rotating shaft and an escapement selectively allowing or denying rotation there-of. An acoustic element cooperates with the escapement such that selective operation of the acoustic element selectively allows or denies rotation of, or controls the rotational speed of the shaft. A machine, such as a toy, having one or more moving elements may be controlled by the motor such that selective operation of the acoustic element selectively allows or denies movement of the machine. Alternation of the volume and/or frequency of the acoustic element may be used to alter the operation of the motor, or the motor may be operated according to the beat and qualities of music. The motor may be operated by remote control of the acoustic element.

20 Claims, 3 Drawing Sheets

US 8,378,196 B2

SONICALLY CONTROLLED WIND-UP MOTOR

FIELD OF THE INVENTION

The present invention is related to wind-up motors, sometimes called wind-down motors. Particularly, the invention is a rotary driving mechanism of the type commonly used to drive toys, timers, and such, in which the wind-down of the mechanism cooperates with and is controlled by a sound-producing element.

BACKGROUND

Wind-up/wind-down motors are well known and commonly used to drive such items as moving toys and timing devices. A crank is generally wound a plurality of rotations against the torsional force of a helical spring to put the motor into a loaded and readied state. The crank may be integral with the motor shaft or may be rotationally engaged therewith by gearing. A locking element may be used to temporarily secure the motor shaft in the readied state if instant operation of the motor is not desired. Release of the crank, or release of the locking element, allows the energy stored in the helical spring to cause rotation of the motor shaft and thereby drive the item. Generally, an escapement is used to slow the operation of the motor and prevent run-away. The escapement generally includes an escapement wheel which rotates with the motor shaft and a governor having a pair of pallets which alternately rock into and out of the teeth of the escapement wheel. The rotational speed of the motor is directly controlled by the rocking frequency of the governor. A well known example of such a governor is the pendulum of a grandfather clock, the swing frequency of which is used to control the speed of the clock.

There are presently no convenient, economical, and simple means for altering the action of an escapement governor to alter the operation of a wind-up motor during wind-down, and such is a feature and an object of the present invention.

There are presently no convenient, economical, and simple means for electronically controlling the action of an escapement governor to electronically alter the operation of a wind-up motor during wind-down, and such is a feature and an object of the present invention.

There are presently no convenient, economical, and simple means for remotely controlling the action of an escapement governor to remotely alter the operation of a wind-up motor during wind-down, and such is a feature and an object of the present invention.

There are presently no convenient, economical, and simple means for combining sound, such as music, with the action of an escapement governor during wind-down of wind-up motors, and such is a feature and an object of the present invention.

Further features and objects of the invention will become apparent upon review of the disclosure of various exemplary embodiments provided herein.

SUMMARY OF THE INVENTION

The invention includes, in combination, a wind-up/wind-down motor, an acoustic element, such as a speaker, and intervening escapement linkage to convert vibratory motion of the acoustic element into a controller for the wind-down of the motor. The motor may be a rotary driving mechanism of the type commonly used to drive toys, timers, and such, and may be pre-loaded and readied for rotational operation against the force of a helical spring. In the disclosed embodiments, a governing element of the escapement linkage retains the motor in the loaded and readied state and denies wind-down.

In use, the speaker of the disclosed embodiments is selectively operated. The speaker may be operated by a program, such as a musical song, may be operated by processed voice commands, or may be operated by a continuous tone whose volume and frequency may be alterable. When operated, the vibration of the speaker drives the governing element to allow wind-down only during and according to the specific vibration of the speaker. The speaker may play music to cause the motor to operate in conjunction therewith, and to the beat there-of. Or the speaker may operate continuously where the frequency or volume of its output may be selectively altered to control the speed of wind-down. The speaker may be controlled remotely through any wired or wireless means to allow operation of the motor to be remotely controlled.

Further features and aspects of the invention are disclosed with more specificity in the Detailed Description and Drawings of an exemplary embodiment provided herein.

BRIEF DESCRIPTION OF THE DRAWINGS

Many aspects of the invention can be better understood with reference to the following drawings of several exemplary embodiments there-of. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Reference is first made to FIGS. 1 through 3E, where there is shown a machine, in the form of walking toy 100, which is driven by sonically controlled wind-up motor 102.

Figure 1:
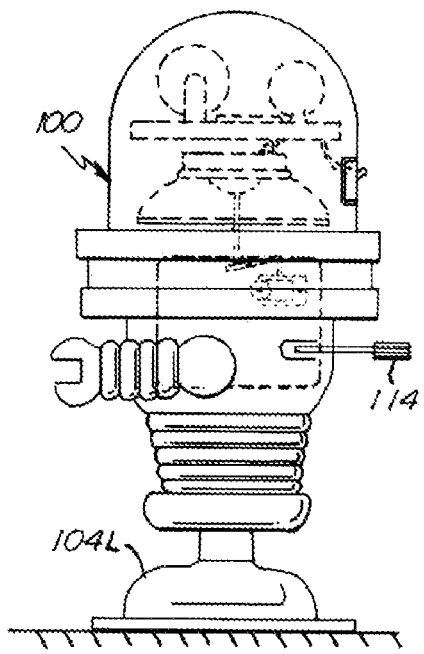
FIG. 1 is a side view of a toy employing a sonically controlled wind-up motor according to an exemplary embodiment of the invention.
Figure 2:
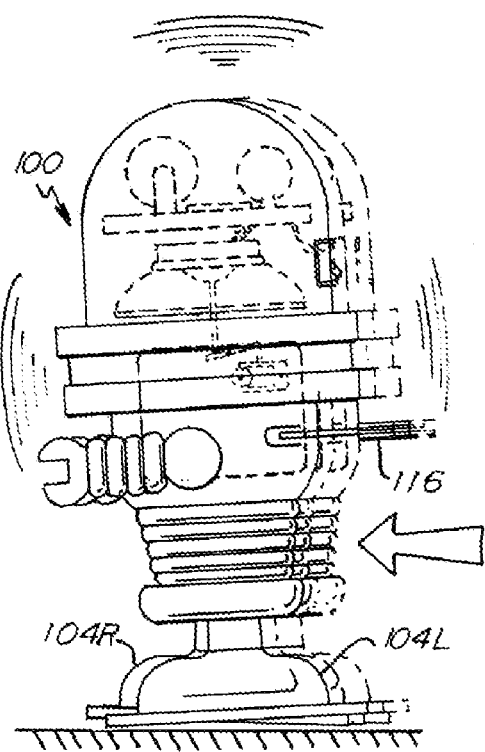
FIG. 2 is a side view of the toy of FIG. 1 walking during wind-down.

Walking toy 100 has feet 104L and 104R which are moved in a walking motion, shown in FIG. 2, when shaft 106 of motor 102 rotates in a counterclockwise direction. This walking motion is accomplished by the linkage 108 connecting motor 102 to feet 104L and 104R.

Motor 102 has a housing 110 containing gearing (not shown) for maintaining the relative rotational speed of output cam 112 to the rotational speed of motor shaft 106. Cam 112 drives linkage 108 during wind-down of motor 102 and counterclockwise rotation of shaft 106, to cause feet 104L and 104R to alternately move in a walking motion.

A helical spring (not shown) is wound around shaft 106 within housing 110, and anchored to both the shaft and the housing, such that forced rotation of the motor shaft in the clockwise direction loads the spring and biases the shaft to turn in the counterclockwise direction. With the shaft fully wound in the clockwise direction towards the limits of the spring, the motor is in a loaded and readied state, with the spring storing rotational energy to drive shaft 106 in a counterclockwise direction for a period of time until the spring is fully unwound and relaxed.

The forced clockwise rotation of shaft 106 to load the spring and put the motor into the readied state is accomplished by manual rotation of crank knob 114, which is rigidly connected to shaft 106 and which coaxially protrudes from the shaft and to the outside of toy 100. Besides being a rotatable knob, the crank could be embodied in a pull cord, a lever, or any equivalent means for causing clockwise rotation of shaft 106.

Coaxially affixed to shaft 106 is escapement wheel 120, which rotates with shaft 106. Wheel 120 rotates with and only when shaft 106 rotates, and shaft 106 rotates with and only when wheel 120 rotates. Wheel 120 has a plurality of escapement teeth 122 circumferentially disposed and equally spaced about its outer diameter. Governor 124 partially surrounds wheel 120, and is adapted to rock in an up and down motion about pivot 126, which allows relative rotational motion between the governor and housing 110, and thereby between the governor and wheel 120.

The governor is biased in an upward position by a spring or other means (not shown). The governor includes pallets 128T and 128B which straddle the escapement wheel such that only one of the pallets may engage the wheel between its teeth at a time as the governor rocks up and down; when the governor rocks upwardly, lower pallet 128B engages the wheel and prevents shaft 106 from rotating, and when the governor rocks downwardly, upper pallet 128T engages the wheel and prevents shaft 106 from rotating.

During the intermediate portion of the rocking motion of governor 124 when neither of the upper or lower pallet engages the teeth of wheel 120, shaft 106 is free to rotate counterclockwise under the influence of the loaded helical spring. Of course, the intermediate portion of the governor's rocking motion is momentary, and the amount of counterclockwise rotation of shaft 106 accomplished during this brief interlude is thereby limited to the displacement of a single tooth 122. For instance, in the present disclosure having twelve teeth 122, the shaft is allowed one-twelfth of a rotation (thirty angular degrees) during each upward and downward rocking cycle of shaft 106.

Control of the rocking of governor 124 will control the rotation of shaft 106, so that the shaft may be prevented from rotating, and thus toy 100 may be prevented from walking, when governor 124 is not being rocked. The shaft can be rotated in a controlled manner so that the walking of toy 100 may be controlled in a similar manner, by controlling the rocking of governor 124. Thus, the rocking of governor 124 both allows and controls the wind-down of motor 102 and the walking of toy 100.

Speaker 130 includes diaphragm 132, which is connected through vertically movable bar 134 to hinge 136, which may swing about pivot 138 to engage and drive governor 124.

Energizing speaker 130 causes diaphragm 132 to vibrate in an up and down cycle, according to the frequency and amplitude of the signal which drives the speaker. The up and down motion of the diaphragm causes bar 134 to move up and down with the diaphragm, thereby rocking hinge 136 and causing the upward and downward rocking of governor 124 and the incremental counterclockwise rotation if shaft 106, approximately thirty angular degrees with each upward and downward cycle of the diaphragm.

Figure 3A:
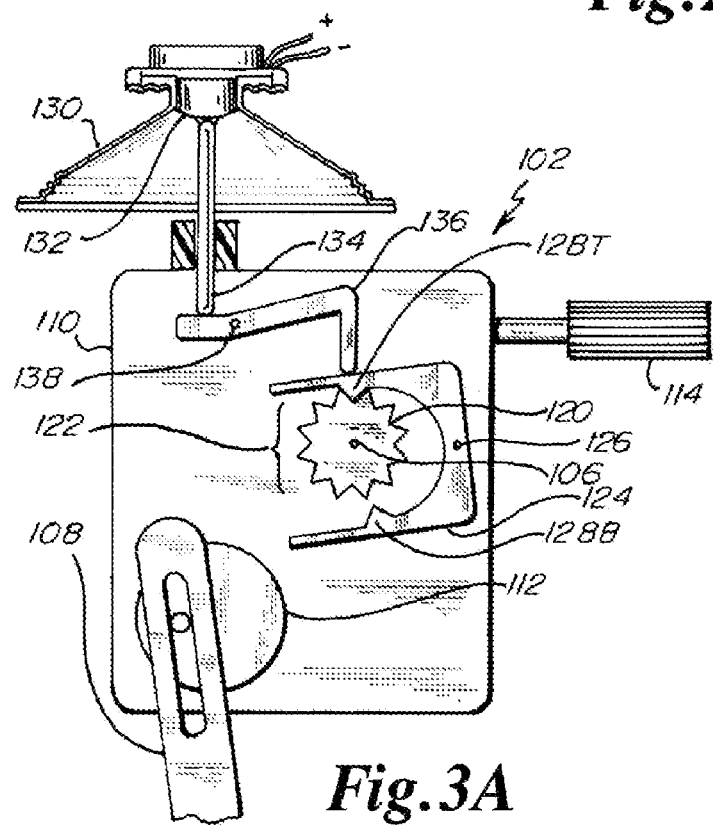
FIG. 3A is a schematic depiction of an exemplary wind-up motor having a first exemplary escapement mechanism according to the invention in a stalled state.
Figure 3B:
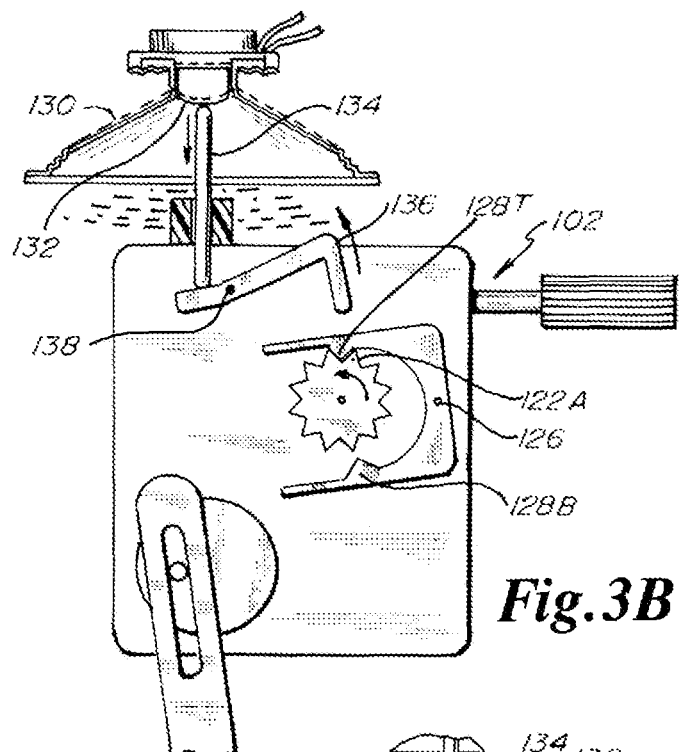
FIG. 3B is a schematic depiction of the motor of FIG. 3 during a first phase of wind-down.
Figure 3C:
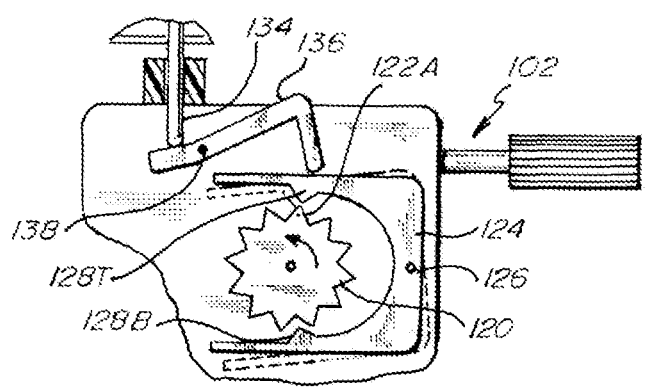
FIG. 3C is a schematic depiction of the motor of FIG. 3 during a second phase of wind-down.

A series showing the rocking cycle of governor 124 and the resulting thirty-degree rotational segment of shaft 106 is shown in FIGS. 3B through 3E. Tooth 122A (marked with a "dot") is initially engaged by pallet 128T. In FIG. 3B, diaphragm 132 pushes bar 134 downwardly, swinging hinge 136 counterclockwise to free governor 124. In FIG. 3C the upward bias on governor 124 causes pallet 128T to lift out of engagement with tooth 122A, thereby allowing wheel 120 to begin to rotate counterclockwise under the influence of the wound helical spring (not shown).

Figure 3D:
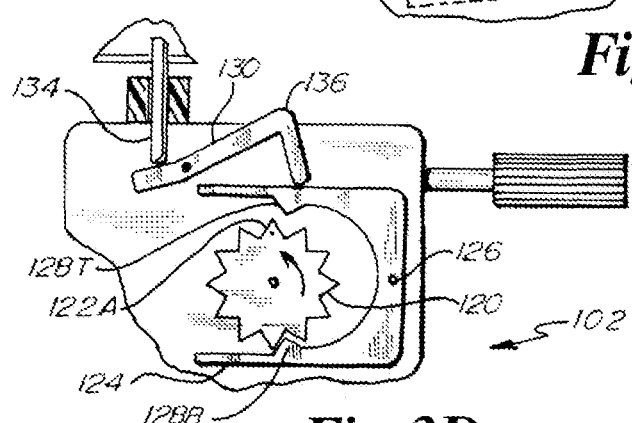
FIG. 3D is a schematic depiction of the motor of FIG. 3 during a third phase of wind-down.
Figure 3E:
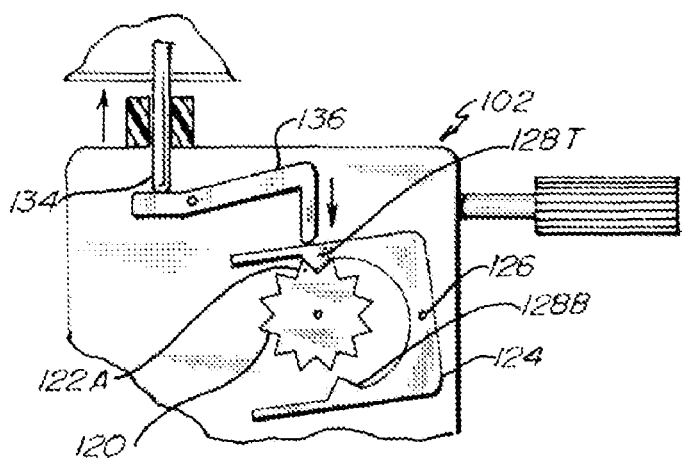
FIG. 3E is a schematic depiction of the motor of FIG. 3 during a fourth phase of wind-down.

Next, as seen in FIG. 3D, lower pallet 128B engages wheel 120 as governor 124 lifts towards its upward position, thereby stopping rotation of the wheel after the wheel has rotated one tooth. In FIG. 3E bar 134 is pulled upwardly to complete the cycle, forcing hinge 136 to rotate clockwise and force governor 124 downwardly, thereby forcing pallet 128T into engagement with the next tooth after tooth 122A. Wheel 120 has thus rotated counterclockwise just one tooth position, or thirty angular degrees. This cycle is repeated with each vibration of diaphragm 132.

Figure 4:
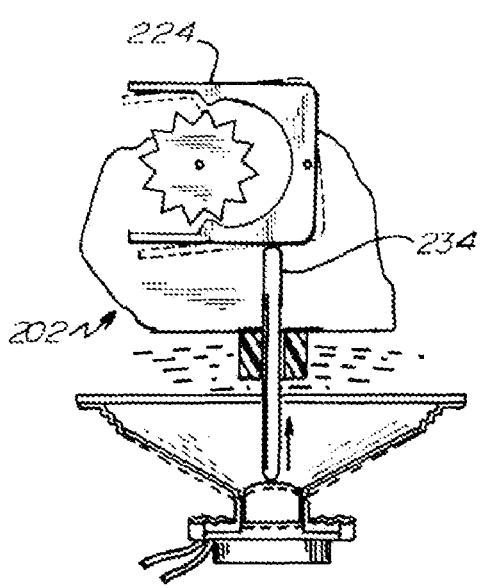
FIG. 4 is a schematic depiction of an exemplary wind-up motor having a second exemplary escapement mechanism according to the invention during wind-down.

FIG. 4 depicts a second exemplary motor 202 according to the invention in which bar 234 drives governor 224 directly.

Figure 5:
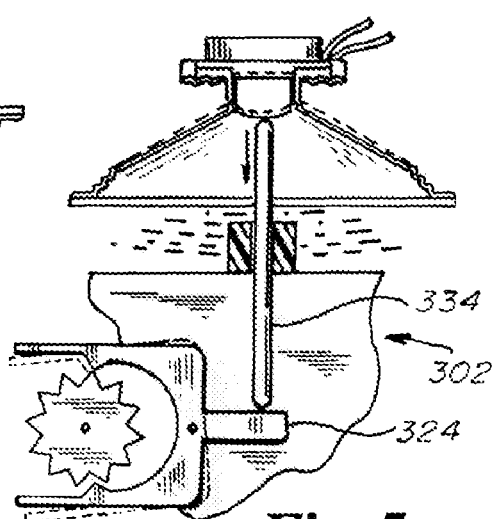
FIG. 5 is a schematic depiction of an exemplary wind-up motor having a third exemplary escapement mechanism according to the invention during wind-down.

FIG. 5 depicts a third exemplary motor 302 according to the invention in which bar 334 drives governor extension 324 directly.

Figure 6:
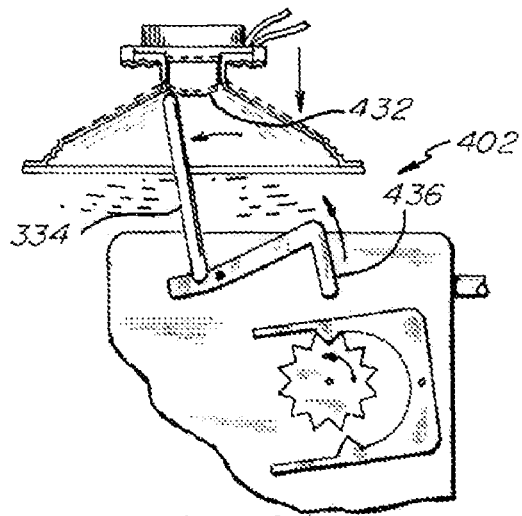
FIG. 6 is a schematic depiction of an exemplary wind-up motor having a fourth exemplary escapement mechanism according to the invention during wind-down.

FIG. 6 depicts a fourth exemplary motor 402 according to the invention in which bar 334 and hinge 436 are rigidly integrated into a single component and swing together under the influence of the vibrations of diaphragm 432.

It should be appreciated that various input signals to speaker 130 with thus cause various results in the walking of toy 100. For instance, a regular or cyclical signal, such as the beat found in a musical song, will cause the toy to start and stop walking at regular intervals, in synchronization with the music.

Alternatively, the frequency of the signal may be altered to slow or speed the shaft rotation and to thereby slow or speed the walking motion of the toy. A 5 KhZ noise signal could thereby be used drive the motor at 25000 RPM;

5K governor cycles/sec×60 sec/min×1 rev/12 cycles=25000 rev/min while tuning the signal down to 1 KhZ would slow the motor to 5000 RPM;

1K governor cycles/sec×60 sec/min×1 rev/12 cycles=5000 rev/min

Or, the volume of the signal may be altered to control the walking motion of the toy. A threshold signal amplitude exists, below which the governor never rocks far enough to disengage the wheel, denying rotation, and above which the governor rocks far enough to disengage the wheel, allowing rotation. A signal that is varying or variable in volume above and below the threshold, by either manual control or program, will cause the motor to wind-down only during those instances when the signal is above the threshold.

Toy 100 may be equipped with a receiver (not shown), such as an RF, IR, or Bluetooth receiver, for receiving and providing signals to speaker 130, so that the toy may be used in conjunction with a remote control (not shown). Alternatively, the remote control may be connected by a cord connected directly to the speaker through a signal processor. Or the remote control may be in the form of a hand-held microphone, allowing the user to cause the toy to walk when he speaks or shouts into the microphone.

This sonic control may additionally be adapted to an electric motor, negating the need for the crank and helical spring, with the governor simply acting to limit and control the electric motor's rotation in a similar manner, thereby providing a superior method of controlling the operation of the motor without complicated electronics. A simple volume control or tuner may be used to replace an expensive amplifier circuit.

The toy could also be equipped with a built-in microphone, sending received noise signals through a signal processor to the speaker so that the motor and walking may be controlled with verbal commands or activated upon the sensing of noise above the threshold level.

In, summary the present invention may be embodied as a sonically controlled motor having a shaft biased to rotate in a first direction, an escapement selectively allowing or denying rotation of the shaft; and an acoustic element cooperating with the escapement, such that selective operation of the acoustic element selectively allows or denies rotation of the shaft in the first direction.

The motor may further have a rotational energy storing element engaging the shaft and a rotatable crank engaging the shaft for rotating the shaft, such that rotating the crank causes rotation of the shaft in a second direction opposite the first direction and causes energy stored in the energy storage element to cause the shaft to be biased to rotate in the first direction. The rotational energy storage element may be a helical spring.

The acoustic element may be a speaker having a vibrating diaphragm in engagement with the escapement such that vibration of the diaphragm allows rotation of the shaft in the first direction. The escapement may have an escapement wheel connected to and rotatable with the shaft such that denial of rotation of the wheel denies rotation of the shaft, and a governor connected to and moved by the diaphragm to allow rotation of the shaft in the first direction during vibration of the diaphragm. The escapement wheel may have a plurality of circumferentially disposed teeth and the governor may have first and second pallets alternately engaging the teeth during the vibration of the diaphragm to control a rotational speed of the shaft.

A sound program may cause intermittent vibration of the diaphragm. The sound program may be a musical song.

The motor may have a volume control for altering a vibration amplitude of the diaphragm, and alteration of the amplitude may alter the rotational speed of the shaft. The motor may have a frequency control for altering a vibration frequency of the diaphragm, and alteration of the frequency may alter the rotational speed of the shaft. The motor may have a remote control for controlling the vibration the diaphragm to remotely control the rotation of the shaft.

Alternatively, the invention may be embodied in the combination of the above motor with a machine. The machine may have machine element engaged by and movable with the shaft such that selective vibration of the diaphragm allows rotation of the shaft in the first direction and causes selective movement of the machine element.

While the invention has been shown and described with reference to specific exemplary embodiments, it should be understood by those skilled in the art that various changes in form and detail may be made without departing from the spirit and scope of the invention, and that the invention should therefore only be limited according to the following claims, including all equivalent interpretation to which they are entitled.

We claim:

1. A sonically controlled motor comprising:
   a shaft biased to rotate in a first direction;
   an escapement selectively allowing or denying rotation of said shaft;
   an acoustic speaker cooperating with said escapement; such that
   selective operation of said acoustic speaker selectively allows or denies rotation of said shaft in said first direction; a rotational energy storage element engaging said shaft; a crank engaging said shaft for rotating said shaft; such that manually rotating said crank causes rotation of said shaft in a second direction opposite said first direction and causes energy stored in said energy storage element to cause said shaft to be biased to rotate in said first direction; wherein said acoustic speaker has a vibrating diaphragm in engagement with said escapement such that vibration of said diaphragm allows rotation of said shaft in said first direction.

2. The motor of claim 1 wherein said rotational energy storage element is a helical spring.

3. The motor of claim 1 further comprising:
   a rotational energy storing element engaging said shaft;
   a crank engaging said shaft for rotating said shaft; such that rotating said crank causes rotation of said shaft in a second direction opposite said first direction and causes energy storage in said energy storage element to cause said shaft to be biased to rotate in said first direction.

4. The motor of claim 3 wherein said rotational energy storage element is a helical spring.

5. The motor of claim 4 wherein said escapement comprises:
   an escapement wheel connected to and rotatable with said shaft such that denial of rotation of said wheel denies rotation of said shaft; and
   a governor connected to and moved by said diaphragm to allow rotation of said shaft in said first direction during vibration of said diaphragm.

6. The motor of claim 5 wherein said escapement wheel comprises a plurality of circumferentially disposed teeth and said governor comprises first and second pallets alternately engaging said teeth during said vibration of said diaphragm to control a rotational speed of said shaft.

7. The motor of claim 6 wherein a sound program causes intermittent vibration of said diaphragm.

8. The motor of claim 7 wherein said sound program is a musical song.

9. The motor of claim 6 further comprising a volume control for altering a vibration amplitude of said diaphragm, and wherein alteration of said amplitude alters said rotational speed of said shaft.

10. The motor of claim 6 further comprising a frequency control for altering a vibration frequency of said diaphragm, and wherein alteration of said frequency alters said rotational speed of said shaft.

11. The motor of claim 6 further comprising a remote control for controlling said vibration of said diaphragm to remotely control said rotation of said shaft.

12. In combination, a sonically controlled motor and a machine;
   said motor comprising:
      a shaft biased to rotate in a first direction;
      an escapement selectively allowing or denying rotation of said shaft;

an acoustic speaker having a vibrating diaphragm in engagement with said escapement; such that selective vibration of said diaphragm allows rotation of said shaft in said first direction a helical spring engaging said shaft for storing rotational energy; a crank engaging said shaft for rotating said shaft; such that manually rotating said crank causes rotation of said shaft in a second direction opposite said first direction and causes energy stored in said helical spring to cause said shaft to be biased to rotate in said first direction;

said machine comprising:

a machine element engaged by and movable with said shaft such that selective vibration of said diaphragm allows rotation of said shaft in said first direction and causes selective movement of said machine element.

13. The combination of claim 12 wherein a musical song causes intermittent vibration of said diaphragm.

14. The combination of claim 12 further comprising a volume control for altering a vibration amplitude of said diaphragm, and wherein alteration of said amplitude alters a rotational speed of said shaft.

15. The combination of claim 12 further comprising a frequency control for altering a vibration frequency of said diaphragm, and wherein alteration of said frequency alters said rotational speed of said shaft.

16. The combination of claim 12 further comprising a remote control for controlling said vibration said diaphragm to remotely control said rotation of said shaft.

17. A remotely controlled, sonically responsive motor comprising:

a shaft biased to rotate in a first direction;

an escapement selectively allowing or denying rotation of said shaft;

a remotely controlled acoustic speaker having a vibrating diaphragm in engagement with said escapement; such that selective vibration of said diaphragm allows rotation of said shaft in said first direction a helical spring engaging said shaft for storing rotational energy; a crank engaging said shaft for rotating said shaft; such that manually rotating said crank causes rotation of said shaft in a second direction opposite said first direction and causes energy stored in said helical spring to cause said shaft to be biased to rotate in said first direction.

18. The motor of claim 17 further comprising a volume control for altering a vibration amplitude of said diaphragm, and wherein alteration of said amplitude alters a rotational speed of said shaft.

19. The motor of claim 17 further comprising a frequency control for altering a vibration frequency of said diaphragm, and wherein alteration of said frequency alters a rotational speed of said shaft.

20. The motor of claim 17 further comprising a remote control for controlling said vibration of said diaphragm to remotely control said rotation of said shaft.

* * * * *